[11] 3,632,214

[72] Inventors David C. Chang
Pleasant Valley;
Rodman S. Schools, Poughkeepsie; Glenn T. Sincerbox, Wappingers Falls; Tien-yu Tao, Poughkeepsie, all of N.Y.
[21] Appl. No. 835,322
[22] Filed June 23, 1969
[45] Patented Jan. 4, 1972
[73] Assignee International Business Machines Corporation
Armonk, N.Y.

[54] METHOD AND APPARATUS FOR STABILIZING THE PHASE OF RADIATION
9 Claims, 7 Drawing Figs.
[52] U.S. Cl................................................ 356/106, 350/3.5
[51] Int. Cl................................................ G01b 9/02, G02b
[50] Field of Search.................................. 356/106; 350/3.5

[56] References Cited
UNITED STATES PATENTS
3,473,031 10/1969 White.......................... 356/106
3,494,698 2/1970 Neumann..................... 356/106

Primary Examiner—Ronald L. Wibert
Assistant Examiner—Conrad Clark
Attorneys—Hanifin and Jancin and John F. Osterndorf ABSTRACT: Stabilization of the phase of the radiation utilized in a plural beam interferometric-type system is accomplished. Monitoring of the intensity of the interfering beams of radiation is performed so that a correction signal is generated. By applying the correction signal to control means, the speed of propagation of at least one of the radiation beams is altered to maintain a constant phase relationship.

INVENTORS
DAVID C. CHANG
RODMAN S. SCHOOLS
GLENN T. SINCERBOX
TIEN-YU TAO

BY John F. Osterndorf
ATTORNEY

METHOD AND APPARATUS FOR STABILIZING THE PHASE OF RADIATION

BACKGROUND OF THE INVENTION

1. Field of the Invention:

This invention relates to the stabilization of the phase of radiation, and, more particularly, to the stabilization of the phase of the radiation in a plural beam interferometric-type system over a finite period of time.

2. Description of the Prior Art:

In interferometric-type systems, such as those employed in the construction of a hologram, the fringe pattern of two or more interfering radiation fields is recorded. Usually, one field is the information or signal field and the other is the reference field. Any charge in the relative phase of these fields results in a shift in the fringe intensity pattern over the hologram recording plate. Fringe contrast is substantially diminished and a weaker holographic image is obtained on readout.

To compensate for any phase shift due to mechanical vibration, thermal shift in the radiation fields or the effects of air turbulence on the radiation, it has been proposed to employ a mechanical transducer to correct for any changes in phase shift. In one proposal the relative phase of the two beams is held constant by sensing the intensity of the fringe pattern through a fixed slit with a photomultiplier tube. The resultant signal is utilized to adjust a piezo-electric phase modulating element to change the relative phase of the two beams by altering the length of the path transversed by one of the beams. The phase modulating element is a piezo-electric crystal stack which drives a small mirror normal to its surface. One of the two interfering beams is reflected from this mirror at near normal incidence.

In the second proposal, frequency modulation feedback is utilized to adjust fringe stabilization. A piezo-electric transducer is employed with one of the reflectors of a laser cavity to alter the effective length of the cavity. By altering the length of the cavity, the frequency of the emitted laser beam is likewise altered, compensating for any laser frequency drift or interferometric path difference perturbations correcting for undesired fringe motions.

SUMMARY OF THE INVENTION

The prior art proposals operate at slow speeds and require the mechanical displacement of a mirror element. As contrasted with these prior art proposals for achieving stability in the fringes produced in interference pattern recording systems, fringe stabilization according to the method and apparatus of this invention is performed at high speeds. The index of refraction of electro-optic control means is electronically changed to change the speed of travel or propagation of the radiation transversing the crystal, thereby compensating for the phase changes.

According to one feature of the invention, the intensity of two interfering beams of light is sensed and an error signal is provided to electro-optic control means located in the path of one of the beams. The electro-optic control means advances or retards the phase of the beam incident on it to provide relative fringe stabilization between the interferring beams.

Other features of the invention provide for the achievement of a greater range of compensation by passing both the signal and reference beams of light through the same electro-optic control means. The beams are caused to have orthogonal polarizations so that each beam is propagated through the means along one of the principal axes of the means. When a correction signal is applied to the crystal the speeds of travel of the two beams are changed in opposite directions to correct for the phase difference between them. When one beam is rotated in polarization state the phases are then substantially the same for the two beams. In this arrangement the correction signal is developed by detecting the intensity of the beams after interference at the recording medium or by splitting out a portion of each beam before the beams interfere.

Another feature of the invention provides for the correction of the relative phase of the interfering beams when at least one of them traverses a diffuser. In this feature, a clear aperture is provided to develop well-defined interference fringes for detection.

DESCRIPTION OF THE PREFERRED EMBODIMENT

Figure 1:
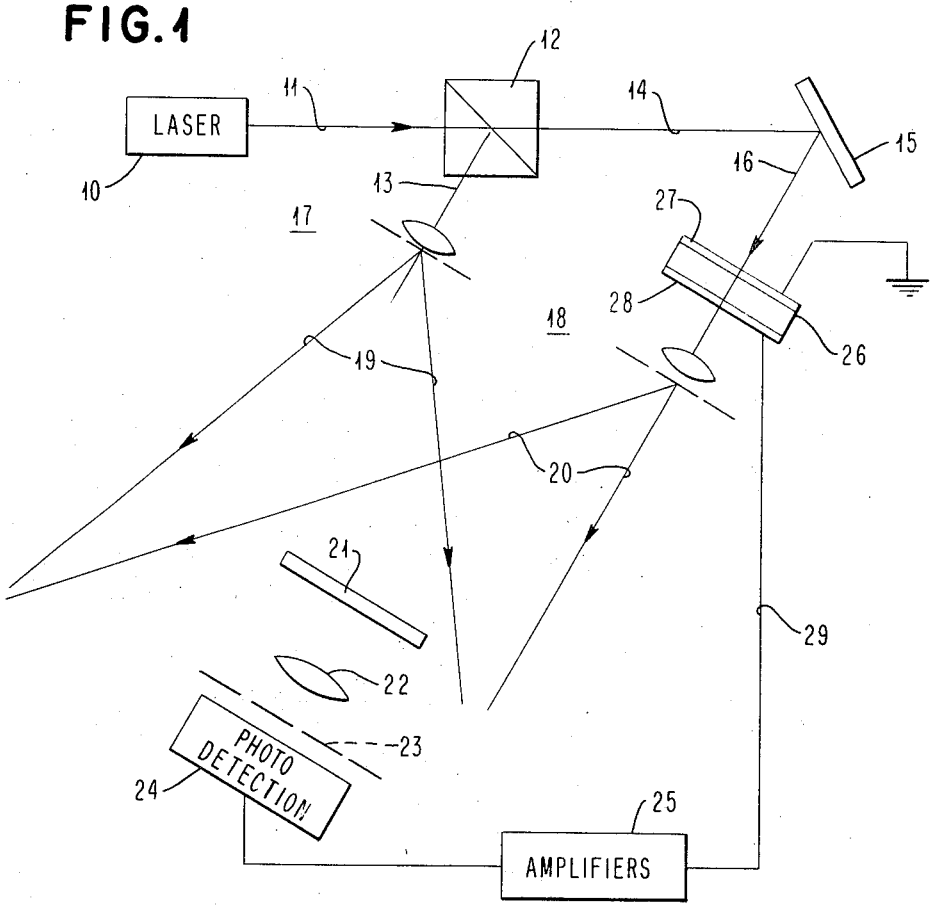
FIG. 1 is a schematic diagram of an interferometric-type system in which the method and apparatus of the invention are employed.

REferring now to FIG. 1, the method and apparatus of the invention are accomplished in an interferometric-type system such as a system for generating holograms.

A source of radiation provides a beam which is broken into two beams for interference at a recording medium. The source of radiation may be any electromagnetic source of radiation and is preferably a laser 10. Beam 11 from the laser is directed to a beam splitter 12 which breaks the beam into component beams 13 and 14. Beams 14 is reflected at mirror 15 to provide the second beam 16 for interference.

Beams 13 and 16 are projected through lens and aperture stop arrangements 17, 18 to form the diverging beams 19, 20 which interfere at a recording medium 21. When a hologram is being formed with information recorded in medium 21, a suitable mask having locations of apertures and no apertures may be positioned in the path of one of the beams 19, 20 for modulating that beam.

Recording medium 21 may be any suitable photographic recording medium. Typically it may take the form of an Eastman Kodak 649 F photographic emulsion. At the side of the emulsion opposite the side of incidence of beams 19 and 20, detection of the intensity of the fringe pattern formed by the interference of beams 19 and 20 is accomplished. Lens 22 projects interfering beams 19 and 20 through a stop 23 to a suitable photodetection arrangement 24.

In interferometric-type systems, the time of exposure of the recording medium is often lengthy. During this time, the relative phase of the interfering beams of radiation, such as in a holographic recording system, varies resulting in the variation of the fringe pattern in the recording medium. The intensity of the fringe pattern shifts over the holographic recording medium. As the efficiency of readout from the processed hologram depends on the average intensity of the contrasting fringes at any particular point in the hologram, stationary interference patterns provide maximum recorded fringe contrast.

The photodetector arrangement 24 monitors the intensity of the fringe pattern as the recording takes place. An electrical signal, indicative of any change in the intensity level, is provided to an amplifier arrangement 25 which generates a correction signal for application across a control device 26. Device 26 may be any electro-optic crystal such as a potassium dihydrogen phosphate (KDP) crystal. The device 26 is provided with a pair of electrodes 27, 28. Electrode 28 is connected to ground the electrode 27 is connected through connection 29 to the amplifier circuitry 25.

Figure 2:
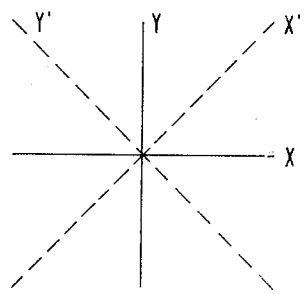
FIG. 2 is a diagram showing the axial relationship of the axes of the control means employed in the apparatus of FIG. 1.

The use of electro-optic crystals as polarization control devices in light deflectors is well known. One such example may be found in application, Ser. No. 285,832 filed June 5, 1963 in the names of Thomas J. Harris et al. and assigned to the same assignee as this invention. In the light deflector type of operation, it is necessary that the light be provided for deflection along the X- or Y-axis as shown in FIG. 2. In this type of operation, the device is activated with one value of voltage to cause the incident light to travel in a path parallel to the X-axis. Application of a second value of voltage across the device causes a rotation in the polarization of the light. The incident light then follows a path parallel to the Y-axis.

As contrasted with this type of operation, the electro-optic crystal 26 in this invention does not act to rotate the polarization of the light incident on it. Rather, the index of refraction of the crystal is altered in small increments to control the speed at which light beam 16 is propagated in transversing the crystal.

Initially, crystal 26 is oriented such that the polarization vector of light beam 16 is aligned to be parallel to one of the optic axes $X'$ or $Y'$ in FIG. 2. THe crystal may be rotated to accomplish this. If it is assumed that light beam 16 follows the $X'$-axis of crystal 26, it continues to follow this axis throughout the recording process. As is well known in holography, it is essential that the polarization directions of both light beams be the same. In the system of this invention the polarization directions similarly remain unchanged. Thus, beam 16 follows a direction parallel to the axis $X'$ of crystal 26.

As already mentioned, photodetection arrangement 24 monitors the intensity of the fringe pattern. When a departure from a constant intensity level is indicated in the photodetection circuits, as will be discussed more particularly hereinafter, the amplifier circuitry 25 generates a correction signal. This signal is applied through connection 29 across crystal 26. The index of refraction of crystal 26 is changed, causing an advance or a retardation in the speed of travel or propagation which beam 16 traverses crystal 26.

In actual practice, it has been found desirable to bias crystal 26 at an initial value. When it is necessary to effect a change of phase in one direction, e.g. a positive change, an increment of voltage is added to that bias voltage value. On the other hand, when it is necessary to effect a change in the opposite direction, e.g. a negative change, a second increment of voltage is added to the bias voltage which is greater than the first increment but which produces the result of a negative change of phase.

Figure 3:
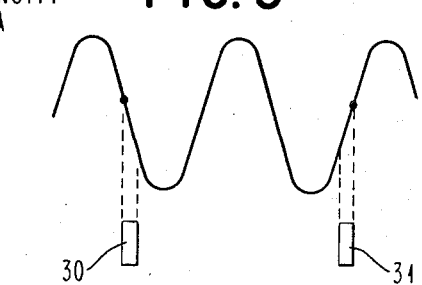
FIG. 3 is a waveform diagram in highly magnified form showing the detection of the intensity of the fringe pattern.

Considering now FIG. 3, there is shown in highly magnified form the intensity distribution of the fringes. The photodetection arrangement includes two photodetecting devices 30 and 31 such as photomultiplier tubes. The fringe pattern that results from the interference of two beams is a series of alternate fringes of light and no light. Where the beams diverge as in the system of FIG. 1, the resulting fringe pattern is a series of concentric ellipses.

As is well known in the art, holograms may be formed employing other than divergent beams of light. For example, the beams may be collimated or converging. Such types of beam geometrys produce fringe patterns that are also well defined and predictable.

To detect the intensity of these patterns photodetectors 30 and 31 are placed an odd number of half fringes apart in the magnified image plane of the fringes. POsitioning of detectors 30, 31 in this manner insures that one detector, e.g. detector 31, faces the negative slope of the intensity profile and the other detector, e.g. detector 30, faces the positive slope. If the fringes move to the right, detector 30 receives more light than detector 31, generating a different signal. Correspondingly, detector 31 also generates a different signal.

Figure 4:
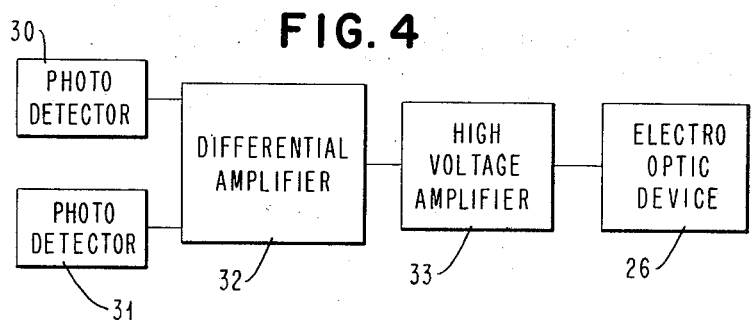
FIG 4 is a block diagram of the circuit arrangement utilized to develop a correction signal for the apparatus of FIG. 1.

As shown in FIG. 4, the photodetectors are connected to a conventional differential amplifier 32 which drives a high-voltage amplifier 33. The high-voltage amplifier may be suitably biased to assure that the desired initial value of voltage is applied across electro-optic device 26.

Application of a different voltage to electro-optic device 26 causes a change in the index of refraction of crystal 26. The speed of travel or propagation of light beam 16 through crystal 26 is altered and the phase of beam 16 is advanced or retarded. The direction of this phase change corrects for the shift in intensity of the detected fringes. Regardless of the original relative position between detectors 30, 31 and the fringes, the feedback circuit, including the differential amplifier and high-voltage amplifier, drives crystal 26 and causes the fringes to shift until the respective negative and positive slopes of the fringes are locked at the same relative location on detectors 30 and 31.

The relationship between optical path difference of two light beams, and the resulting motion of the interference fringes, as shown in FIG. 3, is well known in physical optics. It is given by the formula:

$$\Delta d = l/2 \, \Delta m$$

where $\Delta d$ is the change in optical path difference, $\Delta m$ is the number of bright fringes the cross a fixed line at the detecting device and $\lambda$ is the wavelength of light. For example, if the interfering fringe pattern is observed to translate by one fringe spacing, then an optical path difference of $\phi$ has occurred. The resulting phase shift that must be corrected is given by:

$$\phi = \pi \Delta m$$

In this example $\phi = \pi$

The relationship between fringe shift and electric field on the electro-optic crystal is given by:

$$\phi = \pi \Delta m = 2\pi K l E$$

where $l$ is the thickness of the electro-optic crystal, $K$ is Pockles constant and $E$ is the electric field generated by the error signal.

It is apparent therefore that if two photodetector devices are suitably positioned at predetermined locations with respect to the fringe pattern being formed in the recording medium, the intensity level of the fringe pattern may be detected by these devices. A correction signal is generated by the amplifier circuits for any departure in the intensity level. This signal is applied across the electro-optic device. The electro-optic device in turn has its index of refraction altered, thereby changing the speed of propagation for light beam 16 in traversing the crystal.

Figure 5:
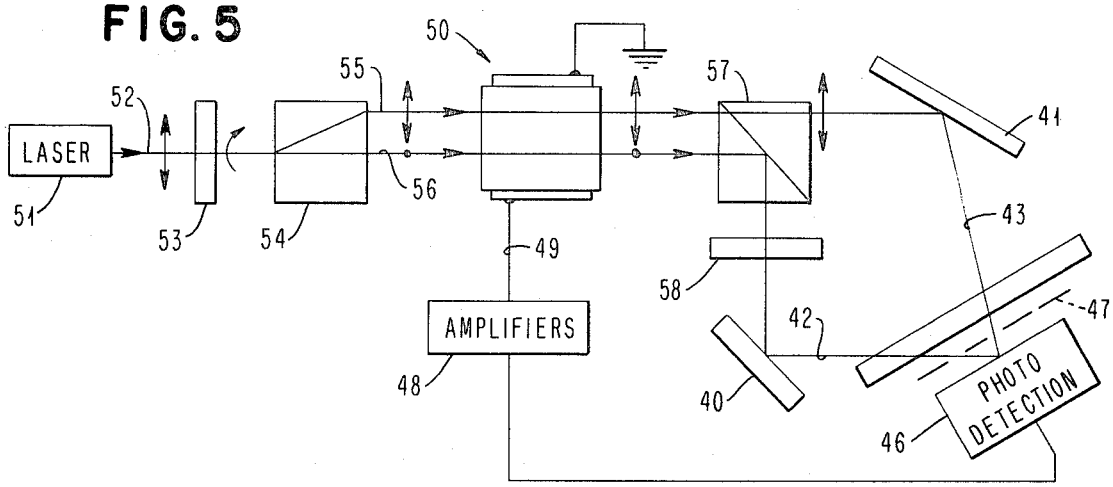
FIG. 5 is a schematic diagram of an alternate type of system utilizing the method and apparatus of the invention and in which the correction is performed on both beams of the system.

In the system of FIG. 1, the phase of only one light beam is corrected. It is readily apparent that the speed of propagation of both beams may be altered and a system for accomplishing this type of correction is shown in FIG. 5. In this system interfering beams 42, 43 (one of which may traverse an information bearing mask) are provided from mirrors 40, 41. Beams 42, 43 interfere at recording medium 45. Photodetection arrangement 46 monitors the intensity of the interferring beams through stop 47. An indication of the intensity level is provided to amplifying circuitry 48 which is connected through connection 49 across electro-optic crystal 50.

In the system of FIG. 5, a greater range of compensation can be obtained as both beams are passed through the same electro-optic crystal 50. A suitable source of radiation such as a laser 51 provides a beam 52 having a vertical polarization direction as indicated by the arrow. Beam 52 traverses a quarter-wave plate 53 which rotates this polarization to a circular polarization. The circularly polarized beam is incident on a birefringent device such as a calcite crystal 54 which breaks the circularly polarized beam into the two beam components 55, 56. Component 55 has a polarization in the plane of the paper and is vertically polarized. Component 56 has a polarization perpendicular to the plane of the paper and is horizontally polarized.

The beams are propagated through crystal 50 such that one of the beams follows the $X'$ of crystal 50 and the other follows the ' of the crystal. When the correction signal is provided to the crystal, the indices of refraction are changed. The speed of travel along one axis is advanced and the speed of travel along the other axis is retarded. The phase correction imparted to the beams occur in faster manner than when a single beam is corrected.

The components 55 and 56 are separated by the beam splitter 57 so that one is passed to mirror 41 providing beam 43 and the other is directed through a half-wave plate 58 rotates the polarization of beam 56 so that the polarization of beam 42 is the same as that of beam 43.

It has been mentioned that the arrangements of FIGS. 1 and 5 can compensate for changes detected in fringe patterns that are the usual well defined and predictable type of patterns. DIfficulty arises in detecting a pattern if one of the beams is diffused. The resulting fringe pattern then becomes a complicated undefinable superposition of many individual fringe patterns. It is not possible, therefore, to sense the shifting of any such fringes with the arrangements of FIGS. 1 and 5.

Figure 6:
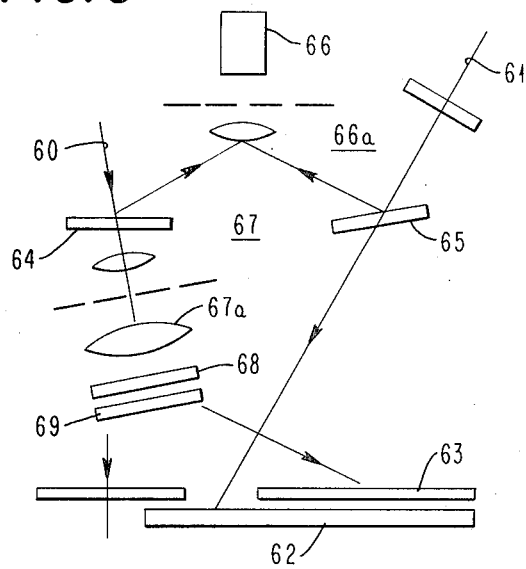
FIG. 6 is a schematic diagram of another alternate type of system employing the method and apparatus of the invention and in which portions of both beams are sampled prior to interference for recording to generate the correction signal; and, FIG. 7 is a schematic diagram of a portion of a further embodiment of the interferometric-type system utilizing the method and apparatus of the invention and in which one of the beams is diffused.

The system of FIG. 6 avoids this problem by separating out a portion of each of the beams to be used in the recording process before passage through the diffuser and before interference at the recording medium. In this system beams 60 and 61 which are provided from either apparatus as shown in FIGS. 1 or 5 are caused to interfere at a recording medium 62 after passage through a plate 63 having an aperture in it. The apertured plate determines the area where recording takes place. Plate 63 is movable to change the area of recording in medium 62. Each of the beams 60, 61 traverses a beam splitter in its respective path of travel. The beam splitters are indicated at 64, 65. The beam splitters separate out a portion of each of these beams and direct them for interference at photodetector arrangement 66 after passage through a spatial filter 66a. Photodetector arrangement 66 monitors the intensity of these interfering beams and provides an indication of any change in intensity and thus of any change in phase occuring in the optical system before the location of beam splitters 64, 65. The signal provided by arrangement 66 is applied back to an electro-optic crystal to control the phase of the beam in the same manner as described for the apparatus of FIG. 1 or FIG. 5.

Beam 60 after a portion is split out at beam splitter 64 is directed through a spatial filter 67, a projection lens 67a to a diffuser plate 68. Radiation in this beam is then diffused across an information mask 69 for interference with the collimated beam 61 at recording medium 62.

In the arrangement of FIG. 6 the interfering beams at the photodetector arrangement 66 produce a fringe structure in the same manner as shown in FIG. 3. In accomplishing this, however, any changes that effect the beams after the point of sampling, i.e, the location of beam splitters 64, 65, are not indicated in the fringe variations that are monitored. Accordingly, the system of FIG. 6 is only capable of partial compensation for phase changes.

Figure 7:
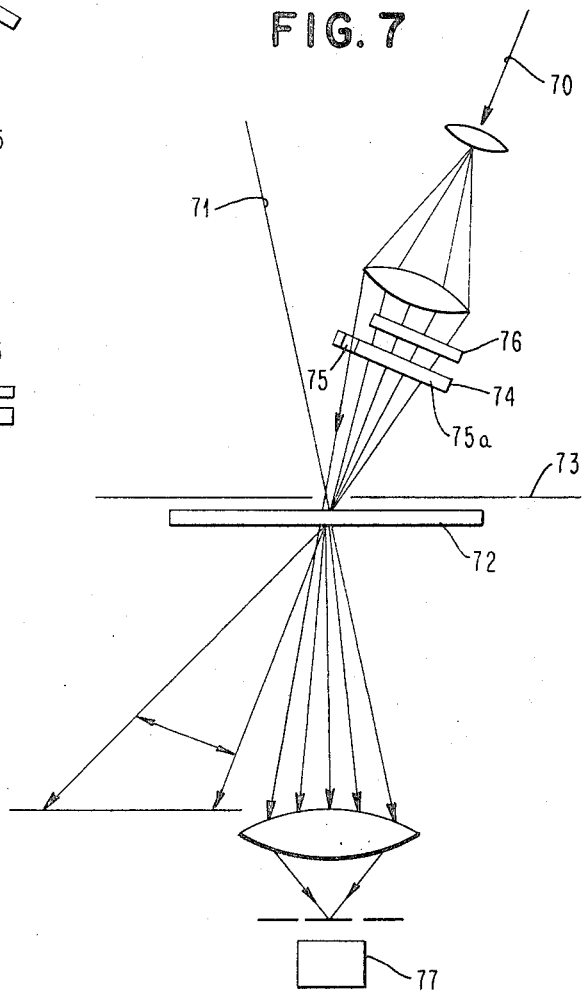

A further arrangement for fringe stabilization in a recording system employing a diffuser plate is shown in FIG. 7. In this system beams 70 and 71 are caused to interfere at a recording medium 72 after passage through a plate 73 with an aperture in it. An information mask 74 is modified from that employed in the system of FIG. 6 to contain a small aperture 75 that is separated from information field 75a contained in the mask. A diffuser 76 is positioned so that only the light through the information field of mask 74 is diffused. Hence the light passing through aperture 75 interferes with reference beam 71 at recording medium 72 to provide a well-defined fringe pattern. That defined fringe pattern in detected by the photodetection arrangement 77 which monitors the intensity of this interference pattern to provide an indication of the phase relationship between the two interfering beams. This indication is in the form of an electrical signal coupled through the circuit of FIG. 4 to act on an electro-optic device which is connected to operate on one beam as shown in FIG. 1 or on both beams as shown in FIG. 5. In this way the effect of movement or vibration of all optical elements in the system, except for the diffuser, is reflected in the fringe pattern and can be corrected. In addition, any changes in optical path will be sensed since the sample beam traverses the same airspace as the actual original beam.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. In a method for stabilizing the phase of the radiation in a dual beam interferometric-type system during a predetermined period of time in which the intensity of the interference pattern resulting from the interference of at least a portion of each of the beams is monitored and a correction signal is generated based on any change in the intensity level, the radiation being provided from a source to the system in two substantially parallel beams propagated in the same direction, the step comprising oppositely changing the speeds of propagation of the beams by applying the generated correction signal across electro-optical control means positioned in the path of the two substantially parallel beams changing their relative phase relationship so that one beam is advanced in phase and the other retarded in phase by a like amount, whereby the intensity of the monitored pattern remains constant.

2. In the method of claim 1, wherein monitoring of the intensity of the interfering beams is performed after the beams pass through a recording medium as the interference pattern is being formed.

3. In the method of claim 1, wherein portions of the beams are split off from the interferometric system for interference and monitoring to develop the correction signal.

4. A method for stabilizing the phase of the light during a predetermined period of time in a dual light beam interferometric-type system, the light being provided from a source to the system in two substantially parallel beams propagated in the same direction, comprising the steps of differentially monitoring the intensity level of the fringes of the interference pattern resulting from the interference of at least a part of each of the beams, generating a correction signal based on any change in the intensity level, and altering oppositely the speeds of propagation of both beams by applying the generated correction signal across electro-optical means positioned in the path of the beams provided to the system so that the index of refraction of the control means is altered to change the relative phase relationship of the interfering beams by advancing the phase of one and retarding the phase of the other by a like amount.

5. Apparatus for stabilizing the phase of radiation in a dual beam interferometric-type system during a predetermined period of time, comprising means for monitoring the intensity level of the interference pattern resulting from the interference of at least a portion of each of the interfering beams, means for generating a correction signal indicative of any change in the intensity level, control means positioned in the path of both beams for oppositely altering the speeds of propagation of said beams in accordance with said signal so that one beam is advanced in phase and the other retarded in phase by a like amount, and means for coupling the correction signal to said control means to effect said change in speeds of propagation, whereby the relative phase of said beams is changed and the intensity level of the monitored pattern remains constant.

6. The apparatus of claim 5, wherein said system further comprises a recording medium wherein said beams interfere and means are provided in the path of each of said beams for splitting out a portion of each of said beams for interference at said monitoring means 7. The apparatus of claim 5, wherein said system is a holographic recording system having a recording medium to record the interference patterns generated by the interference of the two beams one of which is a reference beam and the other an information bearing beam, the monitoring means detecting the intensity level of the interference in said medium of said reference beam and a portion of said information beam.

8. A holographic recording system having provision for stabilizing the phase of the radiation provided from a source during a predetermined period of time, comprising means for forming a reference beam of radiation and an information bearing beam of radiation from the radiation provided from said source, a recording medium, said beams of radiation interfering in said medium to form interference patterns indicative of said information, means for monitoring the intensity of said patterns as they are formed and for generating a correction signal indicative of any change in the intensity level, control means positioned in the path of said beams for oppositely altering by like amounts the speeds of propagation of said beams in accordance with said signal, and means for coupling the correction signal to said control means to effect said change in speed of propagation, whereby the relative phase of said beams is changed and the intensity level of the monitored patterns remains constant.

9. The system of claim 8, wherein the means for forming said information bearing beam comprises an information modulating mask having a clear aperture therein, and radiation diffusing means for diffusing the radiation from said source through all locations of said mask except the location having the aperture therein, the radiation traversing the aperture interfering with said reference beam to form an interference pattern in said medium whose intensity level is monitored to develop said correctional signal.

* * * * *